Patented Jan. 19, 1937

2,068,005

UNITED STATES PATENT OFFICE 2,068,005

ANTIMONY TRIFLUORIDE PREPARATION

Herbert Wilkens Daudt and Mortimer Alexander Youker, Wilmington, and Edwin Lorenzo Mattison, Richardson Park, Del., assignors to Kinetic Chemicals, Inc., Wilmington, Del., a corporation of Delaware No Drawing. Application February 18, 1931, Serial No. 516,824

19 Claims. (Cl. 23—88)

This invention relates to the production of antimony tri-fluoride.

In preparing antimony tri-fluoride from antimony tri-chloride the following procedure has been used heretofore. The antimony tri-chloride was first treated with water and then with mild alkali, such as sodium carbonate to produce antimony oxide. After that the antimony oxide was isolated and treated with aqueous solutions of hydrogen fluoride, that is hydrofluoric acid, to produce the antimony tri-fluoride.

The inherent difficulties in the above described procedure are serious. In the first part of the process, that is, the preparation of the oxide, it has been possible to eliminate most of the combined chlorine with water alone. It has been necessary, however, to treat the isolated solid containing both the oxide and chloride with an alkaline solution to eliminate the remainder of the chlorine.

In the second step the procedure has been to completely evaporate the water from an aqueous solution of antimony tri-fluoride. The hydrolysis of hot aqueous solutions of antimony tri-fluoride is very serious and for this reason the evaporation is usually conducted in the presence of an excess of hydrofluoric acid. This operation is wasteful of hydrofluoric acid and is attended by copious evolution of the corrosive, irritating and toxic fumes of this acid. The product has always contained a high proportion of basic antimony fluoride. For certain operations the presence of moisture or of basic antimony salts in the antimony tri-fluoride present very serious disadvantages. For this reason it has been essential not only to use extreme measures to dry the antimony tri-fluoride very completely but also to sublime it in order to obtain a product free from oxygen containing impurities.

This invention has for an object the preparation of antimony tri-fluoride from other antimony halides by a more direct, a safer and a more economical procedure than heretofore known. Other objects are to prepare antimony tri-fluoride of exceptional purity and in general an advancement of the art. Other objects will appear hereinafter.

These objects are accomplished by the present invention whereby antimony tri-halides, the halogen of which has an atomic weight greater than fluorine (that is greater than 19) are reacted with hydrogen fluoride or hydrofluoric acid. The invention will be readily understood from a consideration of the following examples in which the parts are given by weight.

Example I

In a copper vessel provided with one outlet there was placed 25 parts of liquid hydrogen fluoride and 25 parts of anhydrous antimony tri-chloride. The mixture was agitated for 15 or 20 hours while maintaining a temperautre between 0 and 8° C. The hydrogen chloride formed was allowed to escape through the outlet which was provided with a calcium chloride tube. Thereafter the temperature was allowed to rise to 40–50° C. for the purpose of evaporating the excess hydrogen fluoride. This latter was condensed and recovered by means of a suitable condenser held at about 0° C. The residue in the copper vessel was extracted by carbon tetra-chloride and the insoluble antimony tri-fluoride filtered off. The antimony tri-chloride was recovered by evaporation of the carbon tetra-chloride. The yield of the antimony tri-fluoride based upon the consumed antimony tri-chloride was essentially quantitative.

Example II

Into a copper vessel provided with a gas inlet and a gas outlet were placed 225 parts of antimony tri-chloride crystals. The inlet tube was provided with a plunger for the purpose of clearing it in case of clogging. The outlet tube was provided with means for preventing the admission of moisture and was connected with water filled absorbers for the purpose of absorbing acids. The antimony tri-chloride was melted and while maintaining the temperature of 75–85° C. there was passed into it 60 parts of hydrogen fluoride vapors over a period of 4 to 5 hours. After the reaction had ceased the mass was allowed to cool to room temperature. In carrying out this process the amount of unconverted antimony tri-chloride is sometimes large enough to warrant extraction with carbon tetra-chloride as described in Example I. The yield, based upon consumed antimony tri-chloride was essentially quantitative.

Example III

The apparatus described in Example II was provided with a means for agitation and in it was placed a mixture of 300 parts of nitro-benzene and 225 parts of antimony tri-chloride. The mixture was heated to 125–150° C. and maintained at that temperature while 70 parts of hydrogen fluoride vapors were passed through it during a period of 4 to 5 hours. The mass was agitated continuously during the addition of the hydrogen fluoride. The crystalline solid was removed from the liquid by rapid filtration and washed by small portions of carbon tetra-chloride and the product dried by heating in a vacuum oven at 50° C. The yield of antimony tri-fluoride, based upon consumed antimony tri-chloride was essentially quantitative.

*Example IV*

The apparatus described in Example II was provided with a means for agitation and in it was placed a mixture of 750 parts of carbon tetra-chloride and 225 parts of antimony tri-chloride. The mixture was heated to 60–75° C. and maintained at that temperature while 70 parts of hydrogen fluoride vapors were passed through it during a period of 4 to 5 hours. The mass was agitated continuously during the addition of the hydrogen fluoride. The crystalline solid was removed from the liquid by rapid filtration and washed by small portions of carbon tetra-chloride and the product dried by heating in a vacuum oven at 50° C. The yield of antimony tri-fluoride, based upon consumed antimony tri-chloride was essentially quantitative.

*Example V*

Into an apparatus as described in Example III were placed 240 parts of antimony tri-chloride and 6 parts of water. The mixture was heated to about 100° C. and maintained at this temperature for a period of 3 to 4 hours during which time 75 parts of hydrogen fluoride vapors were passed thereinto. The reaction mass was allowed to cool and the solid antimony tri-fluoride separated from the liquid by means of filtration. The solubility of antimony tri-fluoride in water is so great that it is not advisable to wash the precipitate with water. The product was dried by heating to temperatures approximating 150° C. In certain instances this product has been further purified by sublimation.

It is to be understood that the invention is not limited to the use of the solvents of Examples III, IV and V. Other solvents, for example, chloroform and di-chloro-benzene, may be used. Other water containing solvents, such as aqueous hydrochloric acid, also give desirable results.

Alcohols are of especial interest as solvents for the reason that the halogen derivatives of the alcohols are produced as by-products under certain conditions, for instance, a mixture of ethyl alcohol, antimony tri-chloride and hydrofluoric acid when heated above 70° C. produced antimony tri-fluoride, ethyl chloride, water and hydrochloric acid.

In general, the use of a solvent for the antimony tri-chloride is preferred because it decreases clogging of the inlet tube of the apparatus by the formation of antimony tri-fluoride and also because the separation of the antimony tri-fluoride is accomplished more readily. Ordinarily the antimony tri-fluoride is less soluble than the antimony tri-chloride. The crystals of antimony tri-fluoride may be removed at temperatures lower than those used during the introduction of the hydrogen fluoride.

A still further advantage of the process utilizing a solvent is that the mother liquor may be used for the treatment of further batches of antimony tri-halides. Such a procedure may obviate the loss of considerable portions of the antimony tri-chloride.

If suitable means are provided for the removal of the precipitated antimony tri-fluoride, the procedure may be made an intermittent or continuous one. In such a procedure, antimony tri-chloride and hydrogen fluoride would be added intermittently or continuously; and hydrogen chloride and antimony tri-fluoride would be formed and removed intermittently or continuously. In the presence of an amount of antimony tri-chloride, in excess of that soluble in the solvent, the excess, maintained in a molten condition, can be used to dissolve the antimony tri-fluoride, and, thus, to remove the latter compound.

The concentration of the antimony tri-chloride solution may be regulated so as to cause separation of the antimony tri-fluoride as fast as formed.

The solubility of antimony tri-fluoride in carbon tetra-chloride has been found to be inappreciable.

When organic solvents are used the temperature may be varied between 0° C. and the boiling point of the solution of the antimony tri-chloride in the liquid diluent. Liquid hydrogen fluoride may be used advantageously at temperatures below 19° C. In certain instances, it is necessary to use elevated temperatures because the diluent is solid at ordinary temperatures. It is not desirable to use a diluent which is reactive to antimony tri-fluoride.

When water is used as the diluent, the mother liquor can also be reused for the treatment of a further batch of antimony tri-chloride. By reusing the filtrates from the separation of the antimony tri-fluoride it is possible to operate with almost no loss of antimony halide.

The intermittent or the continuous principle, described above could also be applied to this procedure.

The water may be added with the antimony tri-chloride, with the hydrogen fluoride or with both. It is recognized that the hydrogen fluoride may be added in the form of the anhydrous gas or liquid, or in the form of a mixture of hydrogen fluoride and water.

Where water is used as the solvent the yield, conversion and purity of each individual operation depends upon the relative proportions of water and antimony tri-chloride present when the hydrogen fluoride is supplied. The temperature also influences these characteristics of the process, that is to say, if the amount of water present is too small the presence of the tri-chloride in the final product is favored, if it is too large, little or no antimony tri-fluoride may separate. In the latter case the solution may have to be concentrated by evaporation.

Any of the procedures may be operated under superatmospheric as well as at atmospheric pressure. When pressure is used provision must be made to release the hydrogen chloride.

Antimony tri-halides other than the antimony tri-chloride of the examples may be used satisfactorily.

In any of the procedures covered the hydrogen fluoride may be used in equimolecular quantities or if desired an excess or deficiency may be used. Where an excess is used it is sometimes desirable to have more than one reaction vessel in series.

The hydrogen fluoride may be used as the anhydrous material or as a water solution, either concentrated or dilute.

The advantages of this invention are obvious from a consideration of it.

This invention offers a safe, convenient, and economical process for the preparation of a compound of commercial importance which had heretofore been prepared by unsatisfactory, dangerous and wasteful methods.

As many apparently widely different embodiments of this invention may be made without departing from the spirit and scope thereof, it is to be understood that we do not limit ourselves by the specific embodiments thereof except as defined in the appended claims.

We claim:

1. The process of preparing antimony tri-fluoride which comprises treating solid antimony tri-chloride with hydrogen fluoride at a temperature below the melting point of antimony tri-chloride.

2. The process of preparing antimony tri-fluoride which comprises treating antimony tri-chloride with an excess of hydrogen fluoride in the presence of a diluent.

3. In the separation of antimony tri-chloride and antimony tri-fluoride the step of dissolving the tri-chloride in carbon tetra-chloride.

4. The process of preparing antimony tri-fluoride which comprises treating antimony tri-chloride with hydrogen fluoride in the presence of an antimony tri-chloride solvent.

5. The process of preparing antimony tri-fluoride which comprises treating antimony tri-chloride with hydrogen fluoride in the presence of an organic solvent for antimony tri-chloride.

6. The process of preparing antimony tri-fluoride which comprises treating antimony tri-chloride with anhydrous hydrogen fluoride in the presence of an organic solvent for antimony tri-chloride.

7. The process of preparing antimony tri-fluoride which comprises treating antimony tri-chloride with anhydrous hydrogen fluoride in the presence of an inert organic solvent for antimony tri-chloride.

8. The process of preparing antimony tri-fluoride which comprises treating antimony tri-chloride with hydrogen fluoride in the presence of a nitro-benzene.

9. The process of preparing antimony tri-fluoride which comprises treating antimony tri-chloride with hydrogen fluoride in the presence of a poly-chloro-derivative of a hydrocarbon which is a solvent for antimony tri-chloride.

10. The process of preparing antimony tri-fluoride which comprises treating antimony tri-chloride with hydrogen fluoride in the presence of carbon tetra-chloride.

11. The process which comprises treating anhydrous antimony tri-chloride with substantially anhydrous liquid hydrogen fluoride at a temperature range of about 0 to 15° C.

12. The process which comprises passing about 70 parts of hydrogen fluoride vapors into a mixture comprising about 300 parts of nitro-benzene and about 225 parts of anhydrous antimony tri-chloride maintained at a temperature of about 125 to 225° C.

13. The process which comprises heating a mixture of about 245 parts of antimony tri-chloride and about 6 parts of water to about 100° C. and while maintaining this temperature passing thereinto hydrogen fluoride vapors.

14. The process which comprises heating a mixture of about 245 parts of antimony tri-chloride and about 6 parts of water to about 100° C. and while maintaining this temperature passing thereinto about 75 parts of hydrogen fluoride vapors.

15. In the process of separating antimony tri-chloride and antimony tri-fluoride the steps of dissolving the tri-chloride in a solvent for the same and thereafter isolating the undissolved antimony tri-fluoride.

16. The process of preparing antimony tri-fluoride which comprises treating antimony tri-chloride with hydrogen fluoride in the presence of an organic solvent and separating the solid resultant.

17. The process of preparing antimony tri-fluoride which comprises treating antimony tri-chloride with hydrogen fluoride in the presence of a small amount of water sufficient to prevent separation of the antimony tri-chloride but insufficient to adversely affect the separation of the antimony tri-fluoride.

18. The process of preparing antimony tri-fluoride which comprises treating a mixture of antimony tri-chloride and a small amount of water with hydrogen fluoride, the amount of water being sufficient to prevent separation of the antimony tri-chloride but insufficient to adversely affect the separation of the antimony tri-fluoride.

19. The process of preparing antimony tri-fluoride which comprises treating antimony tri-chloride with hydrogen fluoride in the presence of a small amount of a neutral nonmetallic hydroxyl compound sufficient to prevent separation of the antimony tri-chloride but insufficient to adversely affect the separation of the antimony tri-fluoride.

HERBERT W. DAUDT.
MORTIMER A. YOUKER.
EDWIN LORENZO MATTISON.